Figure 1:
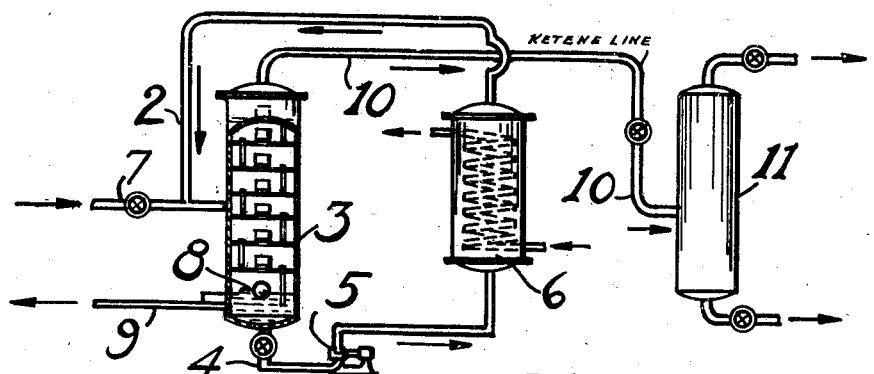

Dec. 26, 1939.   K. T. STEIK   2,184,963

RECOVERING KETENES AND REACTION PRODUCTS THEREOF

Filed Dec. 28, 1935

Karl T. Steik Inventor

By P. L. Young Attorney

Patented Dec. 26, 1939

2,184,963

UNITED STATES PATENT OFFICE 2,184,963

RECOVERING KETENES AND REACTION PRODUCTS THEREOF

Karl T. Steik, Montclair, N. J., assignor to Standard Oil Development Company, a corporation of Delaware Application December 28, 1935, Serial No. 56,423

6 Claims. (Cl. 260—550)

The present invention relates to improvements in the recovery of organic compounds of the type of acetic ketene ($CH_2:CO$) and its homologs and to the production of useful commercial products by reaction with the same, and is a continuation-in-part of my application Serial No. 478,618 filed August 29, 1930 disclosing and claiming a particular thermolytic process of manufacturing ketenes and derivatives thereof.

Broadly, the present invention comprises quenching, i. e. rapidly cooling, hot gaseous reaction products containing ketene or its homologs, by intimately contacting same with a liquid cooling medium, preferably one which is non-reactive with the ketene, to prevent decomposition or polymerization of the ketene and also, if desired, to cause removal of substances less volatile than ketene, whereupon the cooled gases containing ketene are then preferably immediately contacted with a substance with which ketene will react to form a reaction product thereof. Utilization of the invention enables the production of pure ketenes and reaction products thereof and reduces the waste normally occurring in processes of the prior art.

The manufacture of ketene may be carried out by various methods well known in the art, for instance, by passing acetone over various contact bodies at temperatures ranging from 550° to 1200° C., although one of the preferred methods is to pass acetone vapors over copper or some other metal of good heat conductivity free from iron and nickel at a temperature of 600 to 700 or 750° C. Other materials, such as acetic anhydride and acetaldehyde, have also been proposed as raw materials for pyrolysis to produce ketenes.

My original application Serial No. 478,618 discloses the conversion of isopropyl alcohol or other alcohols directly into ketene or its homologs in a reactor having a low temperature zone (about 400° to 625° C.) to convert the isopropyl alcohol substantially completely into acetone, and a high temperature zone (625° to 850° C.) to convert some of the acetone into ketene, preferably using a cyclic process in which only about 5 to 20% conversion is obtained in the high temperature zone. Any isopropyl alcohol remaining unconverted in the low temperature zone will, of course, be converted in the high temperature zone either to acetone, ketene, or decomposition products such as carbon monoxide and hydrocarbon gases.

Ketene is a highly reactive compound and tends to decompose or polymerize on standing, especially at high temperature such as the temperature required for its formation by pyrolysis of acetone and particularly at temperatures above 600° C., and hence it is desirable to rapidly cool the hot gaseous products of pyrolysis, including ketene, to a temperature below that at which the ketene tends to decompose or polymerize to any substantial extent, i. e. to a temperature below 600° C. and preferably even almost down to room temperature. A temperature at or slightly above or slightly below the boiling point of acetone has been found to be a convenient temperature for reasons which will appear more fully herebelow. Suitable provision for this rapid cooling to check any tendency to after-reaction may be provided in various ways as will be explained more fully in discussing the accompanying drawing.

Due to the high reactivity of ketene, it is also desirable, as mentioned above, to cause it to react as soon as possible after its formation. Of the many possible reactions, the following are mentioned:

| Reactant | Reaction product |
|---|---|
| Cellulose (suspended in acetic acid or other suitable liquid). | Cellulose acetate. |
| Anhydrous alcohols | Esters, e. g., acetates, etc. |
| Ammonia | Acetamide. |
| Water (or dilute acetic acid) | Acetic acid (concentrated). |
| Dilute higher organic acids | Concentrated higher organic acids. |
| Hydrogen | Acetaldehyde. |
| Unsaturated hydrocarbons | Addition products. |
| Aniline | Acetanilide. |
| Hydrochloric acid | Acetyl chloride. |
| Impurities in hydrocarbon oils, especially sulfur compounds such as mercaptans. | Corresponding reaction products. |

Of course, ketene may be recovered as such and this is included in the present invention. However, it is preferred to react the ketene as an integral part of the system, either with or without preliminary removal of acetone and other components of the reactive mixture. Instead of a single reaction vessel for the recovery of ketene, any desired number may be provided to insure substantially complete reaction.

The original application 478,618 also contemplated the direct formation of esters, such as isopropyl acetate, by the pyrolysis of isopropyl alcohol under reaction conditions, such as feed rate, temperature, etc., substantially different from those used for the manufacture of ketene or its homologs; for instance, by passing isopropyl alcohol through the low temperature zone of the reactor at such a high feed rate that a substantial amount of unconverted isopropyl alcohol will be present in the gaseous products and then passing said products through the high temperature zone of the reactor at such a feed rate that some of the acetone formed in the low temperature zone will be decomposed to ketene and will immediately react with the unconverted isopropyl alcohol present to form isopropyl acetate which will accordingly be condensed out of the hot gaseous reaction products as soon as they are cooled.

Figure 2:
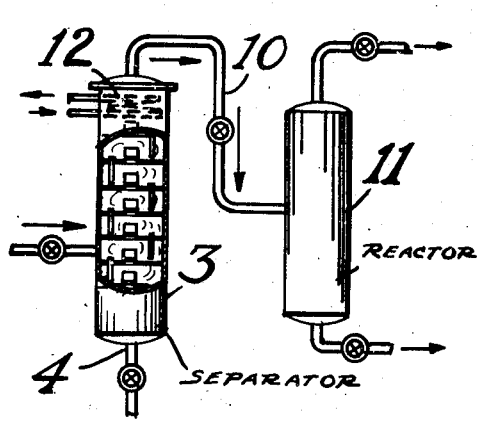
Figure 3:
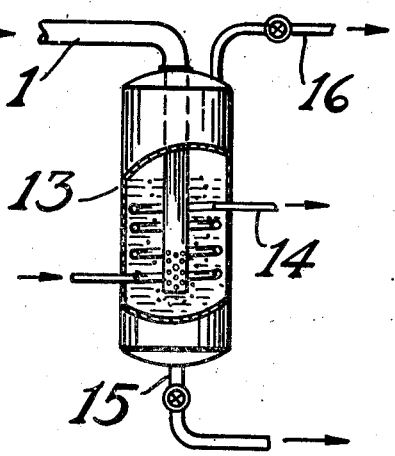
Figure 4:
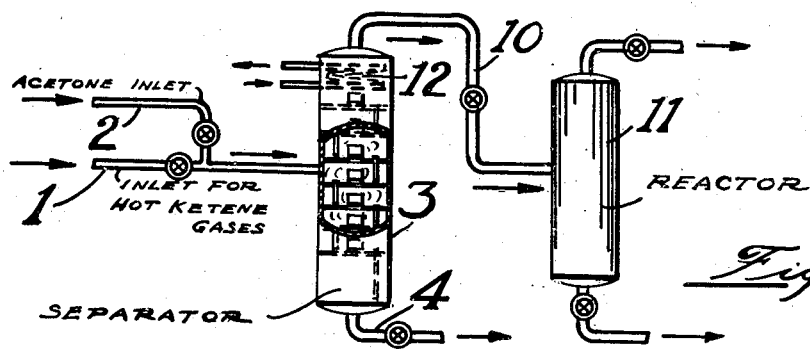

The invention will be fully understood from the following description read in connection with the accompanying drawing in which Figure 1 is a diagrammatic view in elevation of one modification of equipment suitable for practicing the invention in which at least a part of the liquid condensate from the hot gaseous products of pyrolysis containing ketene is cooled and recycled for use in rapidly cooling new quantities of hot gaseous products. Figure 2 shows an alternative modification of equipment wherein the hot gaseous products of pyrolysis are rapidly cooled by contacting with a descending stream of liquid in a bubble cap tower. Figure 3 shows another modification in which the hot gases are introduced into and beneath the surface of a body of cooling liquid, and Figure 4 shows a still further modification in which the hot gaseous products of pyrolysis are rapidly and partially cooled by injection of a stream of acetone and then further cooled in a bubble cap tower.

In all figures like parts are identified by like numerals.

Fig. 1 is an identical copy of Fig. 3 in the original application 478,618 although a different set of numerals is used for identification of the parts. In this form of equipment for carrying out the invention, the hot gaseous products of pyrolysis issuing from a reactor, not shown, pass through inlet line 1 and are met by a cooling agent injected by line 2 which may be the condensate formed from the reaction product and the resulting mixture is discharged into the middle portion of a separator tower 3 which may be provided with the usual bell cap plates or the like. A line 4, in which there is a pump 5, withdraws liquid from the bottom of separator 3. A cooling coil 6 is inserted in line 4 which discharges via line 2 into line 1 and the mixed liquids from the two lines pass into the separator together, thus effecting convenient recycling of a portion of the condensate. Valve 7 is provided in line 1 and may be used to control the pressure. A float control mechanism 8 holds the desired liquid level in separator 3. Surplus liquid is discharged through line 9.

When operating this equipment for the manufacture of acetic ketene according to the purview of the original application, i. e. by the conversion of isopropyl alcohol through the intermediate formation of acetone, the reaction products containing ketene are passed through line 1 into separating tower 3, the temperature of which is maintained at a low point, for example, about +10 to −10° C., by means of cooling coil 6. Under these conditions most of the ketene will pass out through line 10 into the recovery apparatus 11 where the ketene may be reacted with any desired substance reactive therewith, to form reaction products of ketene. This reaction is preferably carried out by intimately contacting the gases containing ketene with the substance to be reacted therewith, as by passing the ketene-containing gases directly into a body of reactive liquid, e. g. an alcohol such as isopropyl alcohol, or an organic solvent liquid containing cotton suspended therein, or by passing the ketene-containing gases into a bubble tower down which the liquid reactive therewith descends in countercurrent. The condensate formed in separator tower 3 is non-reactive with ketene and consists practically entirely of acetone together with some dissolved ketene. It is desirable to return surplus liquid from the separator to the reaction zone in which the ketene is prepared.

The proportion of ketene in the pyrolysis products entering through line 1 or, in other words, the degree of dilution of the ketene with unconverted acetone, may be regulated as desired although, as stated above, about 5 to 10 or 20% conversion of acetone to ketene per pass in the high temperature zone of the reactor gives, in many instances, the greatest overall efficiency for the cyclic operation. For the sake of illustration, some operating data are given in Table 1. In these experiments, isopropyl alcohol was fed into a copper tube packed with brass chips heated to about 600° C. at the inlet or low temperature zone and then directly through the high temperature zone which consisted of an open copper tube heated to the temperature shown in the table, using various feed rates as shown, whereby isopropyl alcohol was converted into acetone in the low temperature zone and part of the acetone was converted into ketene in the high temperature zone without separation of any intermediate or reaction products between the two zones.

*Table 1*

| Run No. | Temperature | | Rate feed | Percent of inlet alcohol | | | | |
|---|---|---|---|---|---|---|---|---|
| | 1st reactor | 2nd reactor | | Recovered as alcohol | To acetone | To acid* | To CO | To unsat. |
| | °C. | °C. | Cc./min. | | Percent | | | |
| A | 600 | 700 | 7 | 0 | 74 | 8.9 | 9.4 | |
| B | 600 | 700 | 8.0 | 0 | 82 | 6.2 | 2.4 | 2.4 |
| C | 600 | 740 | 10.0 | 0 | 76 | 8.8 | 2.2 | 2.2 |
| D | 600 | 740 | 9.5 | 0 | 73 | 10.6 | 4.7 | 2.0 |

*This figure indicates the ketene produced.

The proportion of reaction products not accounted for consists essentially of hydrogen, methane, or higher saturated hydrocarbon gases. The feed rate is expressed as cubic centimeters of liquid (isopropyl alcohol) fed into the reactor per square centimeter of cross section of the reaction tube per minute and is equivalent to a time of contact of about 0.2 to 0.3 second.

The results in Table 1 show that none of the isopropyl alcohol fed into the reactor remained undecomposed and that the gaseous reaction products had approximately the following composition:

| Constituent | Limits | Approx. average |
|---|---|---|
| | Percent | Percent |
| Ketene | 6-11 | 9 |
| Acetone | 70-85 | 77 |
| Carbon monoxide | 2-5 or 10 | 3 |
| Unsaturated hydrocarbons | 2 or 3 | 2 |
| Saturated hydrocarbons + hydrogen (if any) | 7-11 | 9 |
| | | 100 |

Accordingly, the liquid condensate obtained is non-reactive with ketene and consists substantially of pure acetone, although in case the reactor feed rate is too high, a slight amount of isopropyl acetate may appear in the condensate, but this does no harm because it is non-reactive with ketene.

When operating the separator tower 3 at a temperature in the vicinity of 0° C., a substantial proportion of ketene dissolves in the acetone condensate. This does not interfere with the operation of the process since this condensate, containing dissolved ketene, is recycled through the cooling coil 6 for quenching further quantities of hot gaseous products of pyrolysis and hence most of the ketene formed in the pyrolysis passes out through line 10 directly into the reactor 11 where it is intimately contacted with a substance reactive therewith. For instance, it may be reacted with isopropyl alcohol at room temperature or with secondary amyl alcohol at room temperature or with a suspension of cellulose in a suitable liquid, as mentioned above. A small amount of sulfuric acid, zinc chloride or other suitable catalyst may be used to assist these reactions, if desired.

Although in the above experiments certain specific temperatures and feed rates are given, it should be understood that these reaction conditions may be varied considerably without departing from the broad features of the invention. For instance, the temperature in the high temperature zone may vary between the approximate limits of 625° and 850° C. provided that the feed rate is also varied inversely in such a way as to correspond approximately to a feed rate of about 7 to 10 ccs. per minute per square centimeter cross section of reaction zone at a temperature of about 700° to 750° C.

Fig. 2 is a substantial duplicate of Fig. 2 in the original application except that a cooling coil is inserted in the top of the separating tower 3 which serves the same purpose as the separating tower in Fig. 1 described above, and except that no liquid is added as through line 2 in Fig. 1 and consequently the hot gaseous products of pyrolysis containing ketene which enter through line 1 pass into separating tower 3 where condensable products are condensed upon contacting with some of the cooled condensate as it descends from the top of the tower down through the plates and as the gases rise through the bubble caps. The cooled condensate passing on down through the tower may be discharged through the line 4 while the cooled gases pass out the top of the separator through line 10 into reactor 11 in the same manner as described in Fig. 1.

In carrying out the invention with this equipment, a rapid quenching of the hot gases containing ketene is effected by reason of the rapid transfer of heat from the gases coming into intimate contact by bubbling through the thin layers of liquid in the bubble cap tower. The preferred operating temperature of the separating tower 3, when used according to this modification of the invention, is at or slightly below the boiling point of acetone or, in other words, 35 to 50 or 55° C., preferably about 50° C., so that a large amount of heat will be withdrawn rapidly from the hot gases by reason of the absorption of latent heat of vaporization of the acetone condensate. After the gases have been initially cooled down to or almost down to the boiling temperature of acetone upon initial contact with the condensate, the resultant acetone vapors will subsequently be recondensed upon contact with the liquid in the next higher plate or plates in the tower.

This modification of the equipment, as well as that described in Fig. 1, may be used for the recovery of ketene and reaction products thereof when manufactured from acetone as well as from isopropyl alcohol for, as a matter of fact, the composition of the hot gaseous products of pyrolysis and the liquid condensate resulting from the cooling thereof at any temperature of about 0 to 50 or 55° C. are substantially the same whether produced from acetone or isopropyl alcohol as the raw material for the pyrolysis, the only exception being that when starting with isopropyl alcohol the gaseous products contain a small amount of hydrogen and a slightly larger percentage of saturated hydrocarbon gases than when acetone is used as the feed material.

For the sake of illustration, some operating data on the conversion of acetone into ketene are shown in Table 2.

Table 2

| Test No. | Reactor temperature °C. | Feed rate (ccs. per minute) | Percent inlet acetone reacting | Percent reacting acetone to ketene | Percent inlet acetone to ketene | Percent inlet acetone to waste products |
|---|---|---|---|---|---|---|
| 1 | 625 | 0.25 | 7.5 | 67 | 5.3 | 2.2 |
| 2 | 625 | 1.00 | 1.8 | 81.5 | 1.5 | 0.3 |
| 3 | 650 | 0.25 | 16 | 61 | 9.8 | 6.2 |
| 4 | 650 | 1.00 | 4.5 | 73 | 3.3 | 1.2 |
| 5 | 650 | 2.50 | 3.0 | 84 | 2.5 | 0.5 |
| 6 | 700 | 0.25 | 40 | 46.5 | 18.6 | 21.4 |
| 7 | 700 | 1.00 | 20 | 65.5 | 13.1 | 6.9 |
| 8 | 700 | 2.5 | 9 | 77 | 6.9 | 2.1 |
| 9 | 700 | 5.0 | 3 | 84 | 2.5 | 0.5 |
| 10 | 750 | 0.4 | 60 | 35 | 21 | 39 |
| 11 | 750 | 1.0 | 46 | 49 | 22.5 | 23.5 |
| 12 | 750 | 5.0 | 14.5 | 74.5 | 10.8 | 3.7 |
| 13 | 750 | 7.0 | 8 | 79 | 6.3 | 1.7 |
| 14 | 750 | 9.0 | 6 | 80 | 4.8 | 1.2 |
| 15 | 800 | 2.5 | 43.5 | 47.5 | 20.7 | 22.8 |
| 16 | 800 | 5.0 | 26 | 63 | 16.4 | 9.6 |
| 17 | 800 | 7.0 | 18.5 | 69.5 | 12.9 | 5.6 |
| 18 | 800 | 9.0 | 14.5 | 71.5 | 10.4 | 4.1 |

The above data indicate that the optimum operating conditions are a reaction temperature of about 750° C. and a feed rate of about 7.0 ccs. per minute, which corresponds to a time of contact of about 0.3 second at the high temperature (above about 600° C.).

Fig. 3 shows a very simple method of carrying out the invention, i. e. by passing the hot gaseous products of pyroylsis containing ketene through line 1 directly into a body of liquid which is non-reactive with ketene and contained in a suitable drum 13 which is equipped with suitable cooling means such as coiling coil 14. As a result of the quenching of the hot gases, most, if not all, of the acetone vapors present in the hot gases are condensed and accumulate in the drum so that it is necessary to provide suitable means, such as discharge line 15, for removing surplus condensate from the bottom of the drum while the cooled gases containing ketene pass out of the top of the drum through line 16. The quenching liquid contained in drum 13 may suitably be an aliphatic hydrocarbon liquid such as naphtha, an aromatic hydrocarbon liquid such as benzol, aliphatic ketones such as acetone, halogenated compounds such as chloroform, or mixed liquids such as one consisting of equal parts of acetone, benzol and chloroform, or higher boiling liquids may be used, if desired, especially when operating at a temperature above the boiling point of acetone.

In carrying out the invention with this modification of equipment, the temperature of the liquid in the drum 13 may be maintained at a temperature slightly above the boiling point of acetone, such as 60 to 80° C. if it is not desired to condense acetone out of the hot gaseous products of pyrolysis in this drum, or at a temperature below the boiling temperature of acetone such as 0° C., room temperature, or as high as 35 or 50° C. when it is desired to cause the removal of substances less volatile than ketene from the hot gaseous products of pyrolysis.

The cooled gases containing ketene passing out from the drum through line 16 may be conducted to a suitable storage vessel (not shown) but are preferably immediately passed into intimate contact with a substance reactive with ketene to form reaction products thereof in a suitable reactor as described in connection with Figs. 1 and 2.

Fig. 4 shows another modification of the invention in which hot gaseous products of pyrolysis containing ketene pass through inlet line 1 and are met by a small stream of acetone injected through line 2, the proportion of acetone added being only sufficient to reduce the temperature of the hot gases down below the temperature at which ketene tends substantially to decompose or polymerize, for example, about 600° C., and the resultant mixed vapors pass into separator 3 equipped with a cooling coil 12 at the top in substantially the same manner as described in connection with Fig. 2, for further cooling as to below the boiling point of acetone, the cooled gases being passed on to a suitable reactor 11. By the use of this modification of the invention, only a relatively small proportion of cooling liquid is necessary for the initial cooling owing to the absorption of the latent heat of evaporation of the cooling liquid. For instance, if it is desired to cool the hot gaseous products of pyrolysis resulting from the pyrolytic treatment of 100 lbs. of acetone, about 28 to 30 lbs. of acetone (at about atmospheric temperature) suffices for cooling the hot gases from 750° C. down to 600° C.

The foregoing description is illustrative of the preferred embodiments of the invention but various changes and alternative arrangements may be made within the scope of the appended claims, in which it is my intention to claim all novelty inherent in the invention as broadly as the prior art permits.

I claim:

1. In the manufacture of ketene and its homologs by pyrolysis of organic compounds, the step which comprises rapidly and intimately contacting hot gaseous products of pyrolysis including ketene issuing from the pyrolysis zone with a liquid cooling medium, under conditions adapted to cool said gaseous products rapidly to a temperature below the temperature at which the ketene present tends substantially to decompose or polymerize.

2. Process according to claim 1 in which the hot gases are cooled to a temperature between the approximate limits of minus 10 and plus 10° C.

3. Process according to claim 1 in which hot gaseous products of pyrolysis including ketene are substantially identical with products resulting from the pyrolysis of acetone in contact with copper at a temperature of about 750° C. with a feed rate of about 7 ccs. of liquid acetone per square centimeter of reaction chamber cross section per minute.

4. In the manufacture of ketene, the step which comprises rapidly and intimately contacting hot gaseous products of pyrolysis including ketene with a liquid cooling medium, separating from the resulting mixture a gaseous fraction containing ketene and a liquid condensate, recycling at least part of the liquid condensate through a cooling zone and using said cooled condensate as the liquid cooling medium for cooling additional quantities of hot gaseous products of pyrolysis.

5. Process for making reaction products of a ketene which comprises rapidly passing gaseous products of pyrolysis including a ketene into intimate contact with a liquid cooling medium comprising an aliphatic ketone at a temperature such as to cause the removal of substances less volatile than the ketene in said gaseous products by said liquid medium, said liquid cooling medium being the liquid condensate obtained during the first-mentioned contact treatment.

6. Process for making reaction products of a ketene which comprises rapidly passing gaseous products of pyrolysis including a ketene into intimate contact with a liquid cooling medium comprising an aliphatic ketone at a temperature such as to cause the removal of substances less volatile than the ketene in said gaseous products by said liquid medium, and thereafter utilizing said gaseous products to form reaction products of the ketene, said liquid cooling medium being the liquid condensate obtained during the first-mentioned contact treatment.

KARL T. STEIK.